United States Patent [19]

Schicktanz et al.

[11] Patent Number: 5,380,112
[45] Date of Patent: Jan. 10, 1995

[54] ASSEMBLY FOR CONCENTRICALLY POSITIONING A CASING RELATIVE TO A SHAFT

[75] Inventors: Rudolf Schicktanz, Wolfratshausen; Hans-Georg Scherer, Geretsried, both of Germany

[73] Assignee: Feodor Burgmann Dichtungswerke GmbH & Co., Wolfratshausen, Germany

[21] Appl. No.: 40,602

[22] Filed: Mar. 31, 1993

[30] Foreign Application Priority Data

Mar. 31, 1992 [DE] Germany .............. 9204349

[51] Int. Cl.⁶ ........................... F16C 17/22
[52] U.S. Cl. ........................... 403/28; 403/30; 403/26; 403/273; 384/278; 384/905; 384/907.1; 384/913
[58] Field of Search ............ 403/28, 29, 30, 1, 26, 403/273, 365; 310/103; 384/275, 278, 907.1, 913, 905

[56] References Cited

U.S. PATENT DOCUMENTS 4,629,354 12/1986 Freese .................. 403/273 X
4,850,732 7/1989 Swanson ............... 403/28 X
5,094,550 3/1992 Momose et al. ....... 384/907.1 X
5,127,745 7/1992 Momose et al. ....... 384/907.1 X
5,135,314 8/1992 Momose et al. ....... 384/907.1 X

FOREIGN PATENT DOCUMENTS 3706365.0-12 9/1988 Germany ............ F16D 1/06
150019 6/1989 Japan ................ 384/907.1
295025 11/1989 Japan ................ 403/365

Primary Examiner—Randolph A. Reese
Assistant Examiner—Harry C. Kim
Attorney, Agent, or Firm—Griffin Butler Whisenhunt & Kurtossy

[57] ABSTRACT

An arrangement for concentrically positioning a first part relative to a second part, for example, a casing, or sleeve, (2) relative to a shaft (1), when the parts are made from materials with different coefficients of thermal expansion, provides a radial clearance (4) between the first and second parts. The first part (2) is supported along its length by portions facing radially away from the second part, at an abutment arrangement (7, 8) having the same or similar thermal expansion characteristics as the first part (2). The abutment arrangement (7, 8) is held concentric relative to the second part (1).

6 Claims, 1 Drawing Sheet

ASSEMBLY FOR CONCENTRICALLY POSITIONING A CASING RELATIVE TO A SHAFT

BACKGROUND OF THE INVENTION

This invention generally relates to an arrangement for concentrically positioning first and second parts relative to one another, particularly a casing, sleeve, or bushing, relative to a shaft, wherein the parts are made of materials with different coefficients of thermal expansion.

In many instances it is desirable, when positioning parts concentric to one another, to use parts made from various materials with, accordingly, different reactions to changing temperatures. For example, it is often desired to make a bearing sleeve, or journal, of a journal bearing from a wear-resistant material, for example a ceramic, for reducing wear thereof. When such a ceramic bearing sleeve operates, or rotates, together with a component, for example a shaft, made from a type of steel, problems arise because a coefficient of thermal expansion for steel is a multiple of times higher than that of ceramic; thus risking that the bearing sleeve will break when it is used at higher temperatures because of the greater thermal expansion of the metal part. A similar problem arises in low temperatures when ceramic materials hinder shrinkage of attached metal. Therefore, it has been suggested in the prior art to provide O-ring shaped centering elements between a bearing sleeve and a shaft which allow an expansion of the metal shaft relative to the ceramic bearing sleeve. This solution has the disadvantage that, in addition to providing low thermal tolerances of the centering elements, usually insufficient concentric alignment along an axial length of the bearing sleeve is accomplished, which is often unacceptable, because this may cause wear and premature failure at other locations in the overall equipment or machine. It is known from the prior art to arrange so-called tolerance bands between bearing sleeves and shafts, that is, bands having wave-shaped cross sections, thereby having spring characteristics in radial directions. Accuracy of concentric alignment by means of such tolerance bands is also not satisfactory. Further, premature failure of such a bearing sleeve may occur because of high localized wear at those places where the tolerance bands and the bearing sleeve touch. A similar arrangement is disclosed in German patent document DE-C-37 06 365 which discloses a sleeve-shaped middle, or intermediate, part having protruding tongue-shaped portions which are cut out of the middle part in a cost-intensive manufacturing process (laser cutting method), to be positioned between the parts to be centered. In addition to the aforementioned disadvantages, this solution is cost-intensive and appears to create problems during assembly thereof.

It is an object of this invention to provide an apparatus, or assembly, of a type mentioned above which can withstand thermal stress and which allows precise concentric alignment of parts with different thermal expansion reactions with the expenditure of comparatively low technical effort and costs.

SUMMARY

According to principles of this invention, a radial clearance is maintained between the first and second parts with the first part being supported along its length by portions thereof facing radially away from the second part at an abutment arrangement which is concentric relative to the second part, the abutment arrangement being made of material with the same or similar thermal expansion characteristics as the first part.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

An assembly of this invention is described in a preferred embodiment as used in a journal slip bearing arrangement.

Figure 1:
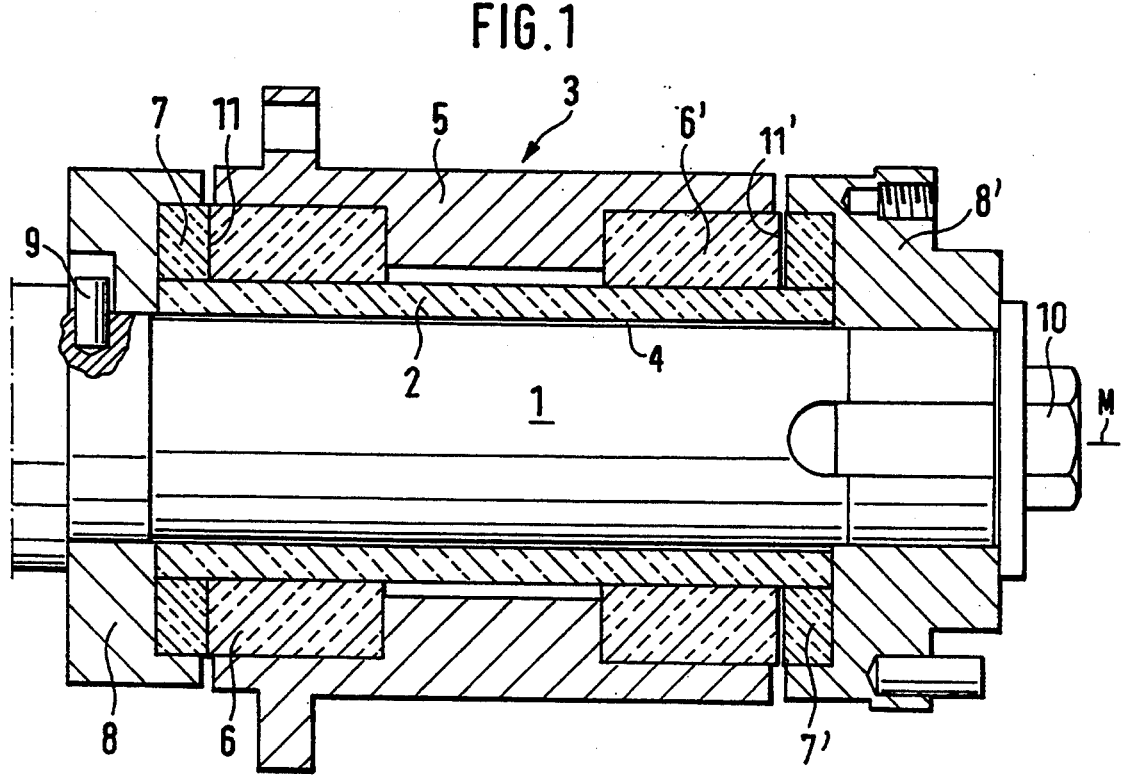
FIG. 1 is a schematic, cross-sectional, side view of an assembly for concentrically positioning two parts in a journal-bearing arrangement according to this invention.

In FIG. 1, numeral 1 refers to a shaft and numeral 2 refers to a bearing sleeve, collar, or casing, turning with the shaft as part of a slide-type journal bearing arrangement 3. According to this invention, there is a radial clearance 4 between the shaft 1 and the bearing sleeve 2, the clearance being arranged to correspond to thermal expansion characteristics of the shaft 1, which is further explained below. The shaft may be made from a suitable type of steel.

The journal bearing arrangement 3 further includes an outer housing 5 which encloses the bearing sleeve 2 at a 5 radial spacing therefrom and which, upon employment of the assembly, is held stationary, the outer housing 5 supporting a pair of axially spaced bearing rings 6, 6' whose inner circumference surfaces cooperate with the bearing sleeve 2 in a well-known manner to form a hydrodynamic radial, or journal, bearing interface with surfaces which slide on one another.

In a preferred embodiment, the bearing sleeve 2 and the bearing rings 6, 6' are made from a suitable wear-resistant material. Although other materials might perform appropriately, in a preferred embodiment, the material used is a ceramic material like silicon carbide which has significantly lower coefficients of thermal expansion than does steel.

The inventive assembly for concentrically positioning the bearing sleeve 2 relative to a centered axis M of the shaft 1 further comprises a pair of axially spaced ring-shaped support elements or centering rings 7, 7' which are mounted, or set, onto the outer circumference of the bearing sleeve 2 along the length thereof by means of a suitably snug, or friction, fit. Each support element 7, 7' is received at its outer periphery, which is facing radially away from the bearing sleeve 2, by a correspondingly shaped receiving, or holding, element 8, 8'0 and affixed thereto, each of the holding elements being locked in position relative to the shaft 1 in an appropriate manner, for example by a pin 9 (see left side of FIG. 1) or a bolt clamping device 10 (see right side of FIG. 1).

Each ring-shaped support element 7, 7' is attached to the corresponding holding, or receiving, element 8, 8' only along its outer circumference. Although other means of attachment could be used, it has proven to be beneficial to shrink fit these members together. Such a shrink fit is designed to ensure sufficient attachment at all times between the holding, or receiving, elements 8, 8' and the support elements 7, 7', even under extreme temperature conditions in which the journal bearing arrangement is used.

Each holding element 8, 8' may be made from the same type of material as the shaft 1, that is, of a type of steel.

In the journal bearing arrangement of the preferred embodiment under varying temperatures, the shaft 1 tends to thermally expand and contract radially substantially more than the bearing sleeve 2, because the steel of the shaft 1 has a coefficient of thermal expansion a multiple of times greater than that of the ceramic material of the bearing sleeve 2. Thus, in varying temperatures the danger arises that the shaft 1 will come into contact with the bearing sleeve 2, thereby placing it under stress and possibly causing it to break. Such a failure is prevented by the sufficient radial clearance 4 which is maintained between the two parts and which allows the shaft 1 to freely expand or contract within the radial clearance 4 without imposing undue stress on the bearing sleeve 2.

Maintaining sufficient radial clearance 4 according to the different thermal expansion characteristics of the shaft 1 and the bearing sleeve 2 is possible, because the concentric support thereof provided by the support elements 7, 7' is at areas of the bearing sleeve 2 which are facing radially away from the shaft 1. To ensure that the support elements 7, 7' behave substantially the same as the bearing sleeve 2 under varying temperatures, and therefore to ensure that concentric positioning of the bearing sleeve 2 relative to the shaft 1 is maintained, the support elements 7, 7' are made preferably of the same material as is the bearing sleeve 2, thereby radial expansion or contraction of the support elements in a manner corresponding to that of the bearing sleeve 2 is provided. If desired, a different type of material may be used for the support elements 7, 7', provided that its coefficient of thermal expansion is the same or similar to that of the material of the bearing sleeve 2.

Further, the material of the support elements 7, 7' should have a suitably greater stiffness, or rigidity, than steel, thus preventing a thermal expansion of the holding elements 8, 8' from having any substantial effect on the thermal expansion characteristics of the support elements 7, 7' because of the lower rigidity of the steel. Also, there are no limitations with regard to the shape or construction of the holding elements 8, 8', thus allowing these to be easily constructed such that the influence of the holding elements on the thermal expansion characteristics of the support elements 7, 7' can be further minimized by construction-related measures.

Further, the support elements 7, 7' may have axially facing surfaces 11, 11' which face each other to form axial bearings with the oppositely and axially facing surfaces of the bearing rings 6, 6', thereby holding the journal bearing arrangement in axial position while allowing rotation.

Figure 2:
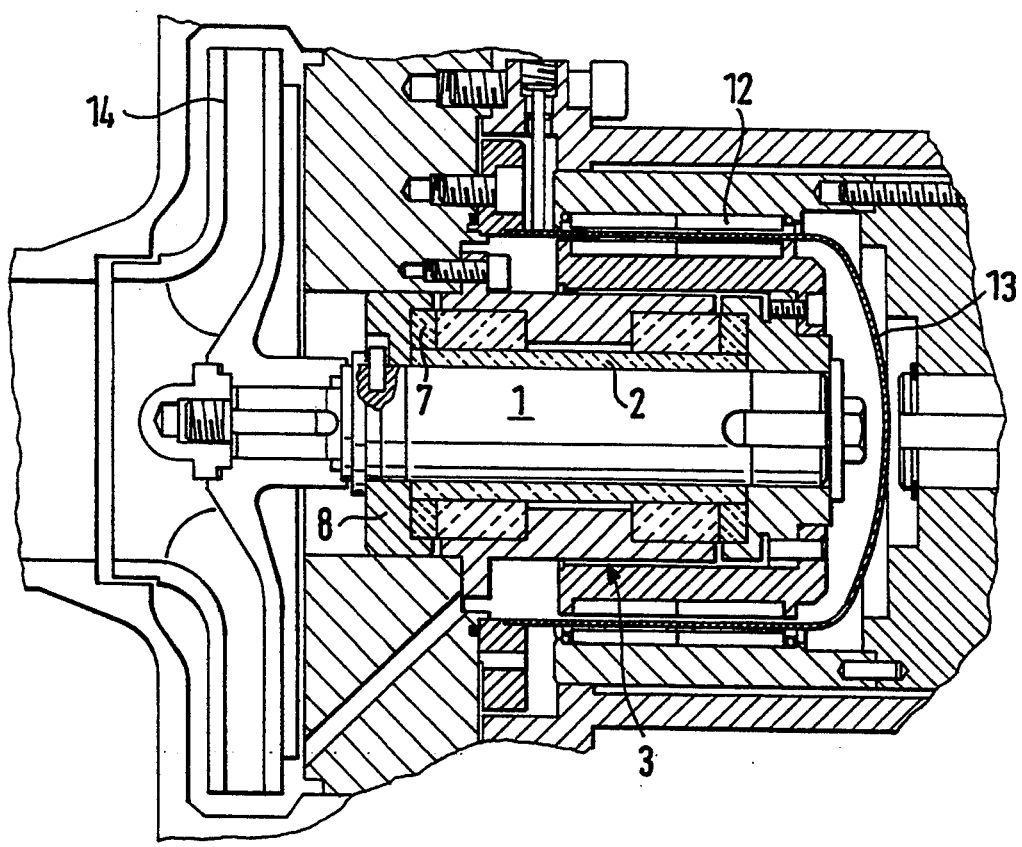
FIG. 2 is a schematic, cross-sectional, partially cut-away, side view of a magnetic clutch having a journal bearing arrangement therein employing principles of this invention.

FIG. 2 shows the above-described journal bearing arrangement in use with a rotary pump, or compressor, driven without contact by means of a magnetic clutch arrangement 12. Sealing of the pump is accomplished on an input-drive side by means of a bowl-shaped separator 13 which extends through a portion of a gap between input-driving magnets and output-driven magnets of the magnetic clutch arrangement 12. Construction of such rotary pumps is basically known to those of ordinary skill in the art and it is thought that further explanation thereof is not needed here.

The shaft 1 which supports the rotary pump wheel 14 is located in a journal bearing arrangement 3 whose bearing sleeve 2 is concentrically positioned in the manner disclosed in the description of FIG. 1. This allows wear-resistant materials to be used for the journal bearing arrangement 3 and to make the gap between the input and output drive magnets as narrow as desired without risking damage to the bowl-shaped separator 13 due to lack of concentricity. Thus, magnetic gap leakages can be minimized by means of the assembly of this invention.

The assembly of this invention allows a measured radial clearance between the first and second parts to be centered such that, even in extreme temperatures, there is always sufficient room for radial expansion of the part which expands more than the other without having to worry about that part coming into contact with the other, less-expanding, part. Since, in this regard, a concentric positioning of the parts is not affected, the part to be centered may be made from a wear-resistant material preferred for certain applications, even if this material, for example a ceramic material, has a considerably lower coefficient of thermal expansion than does steel. In this respect, it is beneficial that the assembly of this invention has an uncomplicated structure which does not pose problems during manufacturing or assembling. Since temperature-sensitive Centering devices, such as O-rings, are not used in this invention, the assembly of this invention may be used in a wide range of temperatures.

It will be understood by those of ordinary skill in the art that this invention provides an assembly which can be used for centering a bearing sleeve of a journal bearing relative to a shaft when the bearing sleeve is made from a wear-resistant material and the shaft is made from steel. Such journal bearings are used beneficially in various areas of technology. The assembly of this invention is particularly beneficial for centering a bearing sleeve of a journal bearing arrangement of magnetic clutches because of its accuracy in centering, thereby allowing only narrow gaps, or clearances, between the magnets which correspondingly reduces losses in magnetic power.

While the invention has been particularly shown and described with reference to a preferred embodiment, it will be understood by those of ordinary skill in the art that various changes in form and detail may be made therein without departing from the spirit and scope of the invention.

For example in the described embodiment, a cylindrically-shaped hollow part, that is, the casing, is positioned concentrically within certain tolerances relative to another cylindrically-shaped part, that is the shaft. However, the assembly of this invention may also be used for concentric positioning of non-cylindrical parts, such as those having with rectangularly-shaped cross sections, relative to a common axle.

The embodiments of the invention in which an exclusive property or privilege are claimed are defined as follows:

1. An assembly comprising a second part concentrically positioned within a first part, said parts being made from materials with different coefficients of thermal expansion wherein radial clearance is maintained between said parts, and wherein said first part is centrally supported along its length by portions facing radially away from said second part at an abutment arrangement which is concentric relative to said second part, said abutment arrangement being made of material having substantially the same thermal expansion characteristics as said first part;

wherein said abutment arrangement is comprised of a pair of axially spaced, ring-shaped support elements made from a material with substantially the same coefficient of thermal expansion as that of said first part; and wherein said support elements are held by holding means for holding said support elements, said holding means being concentrically attached to said second part and being made from a material with substantially the same coefficient of thermal expansion as that of said second part, said support elements being held along portions thereof facing substantially radially away from said first part, but not substantially along portions thereof facing radially towards said first part.

2. An assembly as in claim 1 wherein the first part is made from a wear-resistant, non-metallic material.

3. An assembly as in claim 2 wherein
said first part further includes a bearing sleeve of a journal bearing arrangement, and
said abutment arrangement comprises axially-facing opposite surfaces for holding said journal bearing arrangement in axial position.

4. An assembly as in claim 2 wherein said non-metallic material is a ceramic material.

5. An assembly as in claim 1 wherein said support elements are held to said holding means by a shrink fit.

6. An assembly as in claim 1 wherein said support elements are also held along portions thereof facing substantially axially along said first part.

* * * * *